US007760888B2

(12) United States Patent
Kanamori et al.

(10) Patent No.: US 7,760,888 B2
(45) Date of Patent: Jul. 20, 2010

(54) HOWLING SUPPRESSION DEVICE, PROGRAM, INTEGRATED CIRCUIT, AND HOWLING SUPPRESSION METHOD

(75) Inventors: Takeo Kanamori, Osaka (JP); Takashi Kawamura, Osaka (JP); Tomomi Matsuoka, Osaka (JP)

(73) Assignee: Panasonic Corporation, Osaka (JP)

( * ) Notice: Subject to any disclaimer, the term of this patent is extended or adjusted under 35 U.S.C. 154(b) by 1044 days.

(21) Appl. No.: 10/585,479

(22) PCT Filed: Jun. 7, 2005

(86) PCT No.: PCT/JP2005/010408

§ 371 (c)(1), (2), (4) Date: Jul. 10, 2006

(87) PCT Pub. No.: WO2005/125272

PCT Pub. Date: Dec. 29, 2005

(65) Prior Publication Data

US 2008/0285774 A1 Nov. 20, 2008

(30) Foreign Application Priority Data

Jun. 16, 2004 (JP) ............................ 2004-177860

(51) Int. Cl.
*H04R 27/00* (2006.01)
*H04B 15/00* (2006.01)

(52) U.S. Cl. ........................................ 381/83; 381/93

(58) Field of Classification Search .................. 381/66, 381/83, 93, 96, 98, 56, 58, 59, 94.1, 94.2; 379/406.1, 406.5, 406.8, 406.12–406.14
See application file for complete search history.

(56) References Cited

U.S. PATENT DOCUMENTS 6,442,280 B1 * 8/2002 Ito ............................ 381/83
7,155,022 B2 * 12/2006 Danielsen et al. ........... 381/318
7,310,425 B1 * 12/2007 Benesty et al. ............... 381/66
2002/0154785 A1 * 10/2002 Pedersen .................... 381/59
2004/0170284 A1 9/2004 Janse et al.

FOREIGN PATENT DOCUMENTS

| | | |
|---|---|---|
| JP | 02-143700 | 6/1990 |
| JP | 04-277998 | 10/1992 |
| JP | 8-223274 | 8/1996 |
| JP | 10-145888 | 5/1998 |
| JP | 2002-223182 | 8/2002 |
| JP | 2002-237769 | 8/2002 |
| JP | 2003-250193 | 9/2003 |
| JP | 2003-284183 | 10/2003 |
| WO | 03/010996 | 2/2003 |

* cited by examiner

*Primary Examiner*—Ping Lee
(74) *Attorney, Agent, or Firm*—Wenderoth, Lind & Ponack, L.L.P.

(57) ABSTRACT

Howling, which occurs when amplifying a target sound collected by a first microphone through an amplification section and outputting the amplified sound as an intensified sound from a loudspeaker, is suppressed using a first and second acoustic signal. A first power spectrum is produced according to the first acoustic signal output from the first microphone collecting a sound. A second power spectrum is produced according to the second acoustic signal of a sound including at least the intensified sound and not including the target sound. Then, the first acoustic signal is filtered based on the first power spectrum, and the second power spectrum to output only an acoustic signal of the target sound to the amplification section.

10 Claims, 8 Drawing Sheets

HOWLING SUPPRESSION DEVICE, PROGRAM, INTEGRATED CIRCUIT, AND HOWLING SUPPRESSION METHOD

BACKGROUND OF THE INVENTION

1. Field of Invention

The present invention relates to a howling suppression device, a howling suppression program, an integrated circuit, and a howling suppression method. More particularly, the present invention relates to a howling suppression device, a howling suppression program, an integrated circuit, and a howling suppression method for suppressing the occurrence of howling in a sound-intensifying system for intensifying, through a loudspeaker, a sound signal collected by a microphone.

2. Description of the Related Art

In the prior art, howling suppression devices have been developed for suppressing the occurrence of howling in a sound-intensifying system for intensifying, through a loudspeaker, a sound signal collected by a microphone. A conventional howling suppression device employs a method using the amplitude control of a narrow-band signal (e.g., a notch filter, or a graphic equalizer) for suppressing the signal amplification factor at a frequency at which howling occurs. The method for the amplitude control may be a semi-static method in which the adjustment is done at installation, a method in which a howling detection section is provided for dynamic control based on the detection results, etc., (see, for example, Patent Document 1 and Patent Document 2).

FIG. 7 is a block diagram showing a configuration of a sound-intensifying device disclosed in Patent Document 1. In FIG. 7, the sound-intensifying device includes a microphone 101, a loudspeaker 103, a howling detection section 104, an amplitude-frequency characteristics correcting section 105 and a signal amplification section 106.

Next, the operation of the conventional sound-intensifying device will be described. In the sound-intensifying device, a sound signal received from the microphone 101 is input to the amplitude-frequency characteristics correcting section 105, and the amplitude-frequency characteristics correcting section 105 corrects the frequency characteristics. The amplitude-frequency characteristics correcting section 105 outputs the corrected sound signal to the signal amplification section 106. Then, the signal amplification section 106 amplifies the received sound signal, and a sound based on the sound signal is output from the loudspeaker 103 into the sound field.

Howling occurs at a frequency at which the gain of the loop of the transmission system exceeds one due to the intensified sound from the loudspeaker 103 being introduced back into the microphone 101. Therefore, in order to suppress the howling while keeping the sound intensification level, the signal level is attenuated only for a frequency band where the loop gain exceeds one. The frequency band to be attenuated is pre-adjusted according to the sound field in which the sound-intensifying device is installed. The environment of the sound field varies depending on the position of the microphone 101 during the use of the sound-intensifying device. Therefore, the occurrence of howling is detected by the howling detection section 104 to constantly control the frequency band to be attenuated by the amplitude-frequency characteristics correcting section 105, thereby realizing a more versatile sound-intensifying device.

FIG. 8 is a block diagram showing a configuration of a howling cancellation device disclosed in Patent Document 2. In FIG. 8, the howling cancellation device includes the microphone 101, the loudspeaker 103, a signal subtraction section 107, an adaptive filter section 108, and a signal amplification section 109.

Next, the operation of the conventional howling cancellation device will be described. In the howling cancellation device, the sound signal received from the microphone 101 is input to the signal subtraction section 107, and the signal subtraction section 107 performs a subtraction operation between the sound signal and the output signal from the adaptive filter section 108. The signal subtraction section 107 outputs the subtracted output signal to the signal amplification section 109. Then, the signal amplification section 106 amplifies the received output signal, and a sound based on the sound signal is output from the loudspeaker 103 into the sound field. Based on the output signal from the signal amplification section 109 and the output signal from the signal subtraction section 107, the adaptive filter section 108 estimates the transmission characteristics of the sound field through which the intensified sound output from the loudspeaker 103 enters the microphone 101 (the transmission characteristics of the loudspeaker 103 and the transmission characteristics of the microphone 101), and outputs the pseudo echo of the intensified sound coming from the loudspeaker 103 and entering the microphone 101 to the signal subtraction section 107. Thus, in the signal subtraction section 107, a component of the intensified sound from the loudspeaker 103 that travels around back to the microphone 101 is canceled with the pseudo echo produced by the adaptive filter section 108, thereby cutting off the howling loop, providing a howling suppression effect.

Patent Document 1: Japanese Patent No. 3152160

Patent Document 2: Japanese Patent No. 2560923

BRIEF SUMMARY OF THE INVENTION

However, with the configuration of the sound-intensifying device disclosed in Patent Document 1, the attenuation of the frequency band where howling occurs deteriorates the sound to be intensified. Moreover, the sound-intensifying device provides a howling suppression effect only for a limited frequency band, and it is difficult to obtain a large howling margin such that the sound intensification level is increased.

With the configuration of the howling cancellation device disclosed in Patent Document 2, it is possible, theoretically, to cancel the howling loop by the adaptive filter section 108 and to obtain a large howling margin. In an actual sound field, however, the sound field transmission system varies due to changes in the room temperature, changes in the position of the microphone 101, etc. The adapting speed of the adaptive filter section 108 is not high enough to follow such variations, thus presenting a stability problem in practice. As a result, it is difficult to obtain a sufficient howling margin.

Therefore, an object of the present invention is to provide a howling suppression device, a howling suppression program, an integrated circuit, and a howling suppression method, capable of operating for a wide frequency band while ensuring an operation stability, thus significantly improving the howling margin.

To achieve the above object, the present invention has the following aspects.

A first aspect is directed to a howling suppression device for suppressing howling, which occurs when amplifying a target sound collected by a first microphone through an amplification section and outputting the amplified sound as an intensified sound from a loudspeaker. The howling suppression device includes a first power spectrum information producing section, second acoustic signal obtaining means, a second power spectrum information producing section, and a suppression filter section. The first power spectrum information producing section produces a first power spectrum according to a first acoustic signal (e.g., an electric signal) output from the first microphone collecting a sound. The second acoustic signal obtaining means obtains a second acoustic signal (e.g., an electric signal) of a sound including at least the intensified sound and not including the target sound. The second power spectrum information producing section produces a second power spectrum according to the second acoustic signal. The suppression filter section filters the first acoustic signal based on the first power spectrum and the second power spectrum to output only an acoustic signal of the target sound to the amplification section.

According to a second aspect, in the first aspect, the second acoustic signal obtaining means is a second microphone provided in a sound field in which the first microphone and the loudspeaker are provided, the second microphone not collecting the target sound while collecting at least the intensified sound in the sound field to output the second acoustic signal.

According to a third aspect, in the first aspect, the second acoustic signal obtaining means is realized by connecting a line between the amplification section and the loudspeaker with the second power spectrum information producing section so that a signal output from the amplification section is output to the second power spectrum information producing section as the second acoustic signal.

According to a fourth aspect, in the first aspect, the howling suppression device further includes a signal-to-signal delay detecting section and a signal delaying section. The signal-to-signal delay detecting section detects a delay time between the first acoustic signal output from the first microphone and the second acoustic signal. The signal delaying section inputs the second acoustic signal to the second power spectrum information producing section after delaying the second acoustic signal according to the delay time detected by the signal-to-signal delay detecting section.

According to a fifth aspect, in the first aspect, the howling suppression device further includes a learning control section, a ratio storing section, and a spectrum ratio estimating section. Based on the first acoustic signal and the second acoustic signal, The learning control section detects a period in which the first microphone is not collecting the target sound and the second acoustic signal is indicating the intensified sound or a reverberating sound of the intensified sound, and outputs a control signal indicating the period. The ratio storing section stores a ratio of the second power spectrum with respect to the first power spectrum. The spectrum ratio estimating section calculates the ratio of the second power spectrum with respect to the first power spectrum when the control signal is indicating the period, and updates the stored ratio in the ratio storing section by a predetermined method using the calculated ratio. The suppression filter section estimates a sound component other than the target sound, which has been mixed in the first acoustic signal, by using the first power spectrum, the second power spectrum and the ratio stored in the ratio storing section and suppresses the sound component in the first acoustic signal to thereby output only an acoustic signal of the target sound to the amplification section.

According to a sixth aspect, in the fifth aspect, the learning control section outputs a control signal indicating the period by a ratio of a signal level of the second acoustic signal with respect to a signal level of the first acoustic signal. The spectrum ratio estimating section calculates the ratio of the second power spectrum with respect to the first power spectrum when the signal level ratio indicated by the control signal is greater than or equal to a threshold value.

According to a seventh aspect, in the first aspect, the suppression filter section filters the first acoustic signal by a Wiener filter method based on the first power spectrum and the second power spectrum so as to output only an acoustic signal of the target sound to the amplification section.

According to an eighth aspect, in the first aspect, the suppression filter section filters the first acoustic signal by a spectral subtraction method based on the first power spectrum and the second power spectrum so as to output only an acoustic signal of the target sound to the amplification section.

A ninth aspect is directed to a howling suppression program, which can be recorded on a recording medium, executed by a computer for suppressing howling, which occurs when amplifying a target sound collected by a first microphone through an amplification section and outputting the amplified sound as an intensified sound from a loudspeaker. The howling suppression program instructs the computer to perform a first power spectrum information producing step, a second acoustic signal obtaining step, a second power spectrum information producing step, and a suppression step. The first power spectrum information producing step is a step of producing a first power spectrum according to a first acoustic signal output from the first microphone collecting a sound. The second acoustic signal obtaining step is a step of obtaining a second acoustic signal of a sound including at least the intensified sound and not including the target sound. The second power spectrum information producing step is a step of producing a second power spectrum according to the second acoustic signal. The suppression step is a step of filtering the first acoustic signal based on the first power spectrum and the second power spectrum to output only an acoustic signal of the target sound to the amplification section.

A tenth aspect is directed to an integrated circuit for suppressing howling, which occurs when amplifying a target sound collected by a first microphone through an amplification section and outputting the amplified sound as an intensified sound from a loudspeaker. The integrated circuit includes a first power spectrum information producing section, a second power spectrum information producing section, and a suppression filter section. The first power spectrum information producing section receives a first acoustic signal output from the first microphone collecting a sound, and produces a first power spectrum according to the first acoustic signal. The second power spectrum information producing section receives a second acoustic signal of a sound including at least the intensified sound and not including the target sound, and produces a second power spectrum according to the second acoustic signal. The suppression filter section filters the received first acoustic signal based on the first power spectrum and the second power spectrum to output only an acoustic signal of the target sound to the amplification section.

An eleventh aspect is directed to a howling suppression method for suppressing howling, which occurs when amplifying a target sound collected by a first microphone through an amplification section and outputting the amplified sound as an intensified sound from a loudspeaker. The howling suppression method includes a first power spectrum information producing step, a second acoustic signal obtaining step, a second power spectrum information producing step, and a suppression step. The first power spectrum information producing step is a step of producing a first power spectrum according to a first acoustic signal output from the first microphone collecting a sound. The second acoustic signal obtaining step is a step of obtaining a second acoustic signal of a sound including at least the intensified sound and not including the target sound. The second power spectrum information producing step is a step of producing a second power spectrum according to the second acoustic signal. The suppression step is a step of filtering the first acoustic signal based on the first power spectrum and the second power spectrum to output only an acoustic signal of the target sound to the amplification section.

According to the first aspect, the intensified sound component or the reverberating sound component, which may enter the first microphone, can be suppressed by the noise suppression mechanism. Specifically, a sound component of the intensified sound from the loudspeaker to be reintroduced into the first microphone is suppressed by the suppression filter section, thereby cutting off the feedback loop and thus providing a howling suppression effect. As opposed to the conventional adaptive filter method, etc., the present invention uses a power spectrum for howling suppression. Therefore, the operation is stable against phase changes because no phase information is used, thus being robust against the movement of the first microphone, environmental changes of the sound field, etc., whereby it is possible to realize a stable howling suppression effect.

According to the second aspect, it is possible to easily obtain a second acoustic signal by using a second microphone, separate from the first microphone. For example, the second microphone may be a microphone provided at a sufficient distance from the speaker or the instrument producing the target sound, or may be a highly directional microphone provided at such a position that the speaker or the instrument producing the target sound is within the dead angle of the directionality, whereby it is possible to easily obtain the second acoustic signal.

According to the third aspect, the output from the amplification section to the loudspeaker is directly connected to the second power spectrum information producing section, whereby it is possible to easily obtain the second acoustic signal while eliminating the need to provide a microphone separate from the first microphone.

According to the fourth aspect, where the time required for the intensified sound output from the loudspeaker to arrive at the first microphone has a time difference that is not negligible for the suppression process, the signal-to-signal time difference is corrected, whereby it is possible to maintain the howling suppression performance.

According to the fifth aspect, by using a power spectrum ratio in a state where the first microphone is not collecting the target sound but the intensified sound is being output from the loudspeaker, it is possible to obtain a power spectrum of only the target sound in which unnecessary sound components have been removed from the first power spectrum of the target sound with the intensified sound or the reverberating sound being mixed therein. Using these relationships, the suppression filter section can extract, from the first acoustic signal, an acoustic signal of only the target sound.

According to the sixth aspect, the ratio of the signal level of the second acoustic signal with respect to the signal level of the first acoustic signal is represented by a control signal, whereby it is possible to easily represent, based on the signal level thereof, a state where the first microphone is not collecting the target sound but the intensified sound is being output from the loudspeaker.

According to the seventh and eighth aspects, by using a Wiener filter method or a spectral subtraction method based on the first and second power spectra, it is possible to appropriately filter the first acoustic signal to extract an acoustic signal only of the target sound.

The howling suppression program, the integrated circuit and the howling suppression method of the present invention also provide similar effects to those of the howling suppression device as described above.

DETAILED DESCRIPTION OF THE INVENTION

First Embodiment

Figure 1:
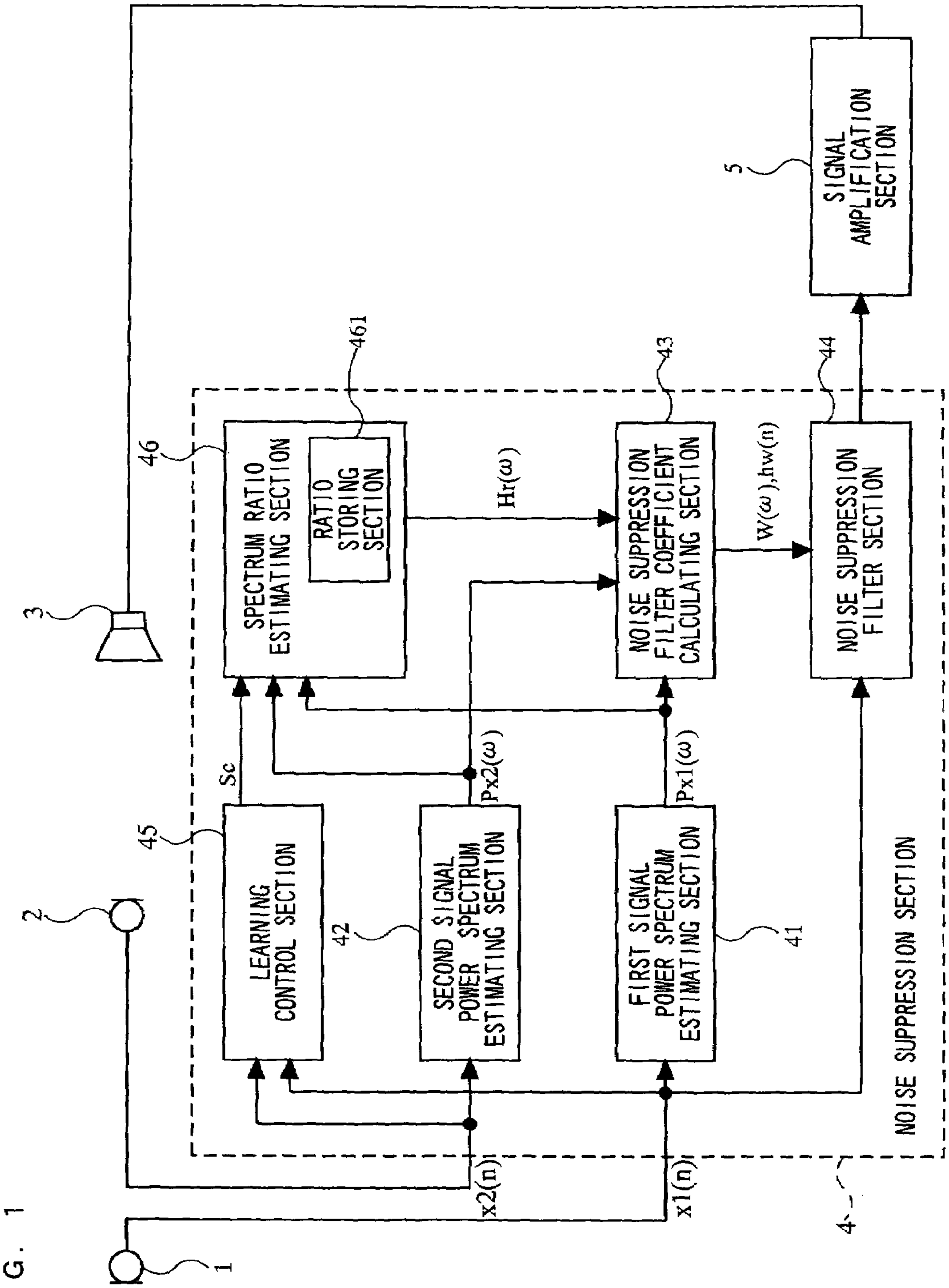
FIG. 1 is a block diagram showing a howling suppression device according to a first embodiment of the present invention.

Referring to FIG. 1, a howling suppression device according to a first embodiment of the present invention will be described. FIG. 1 is a block diagram showing the howling suppression device.

In FIG. 1, the howling suppression device includes a first microphone 1, a second microphone 2, a loudspeaker 3, a noise suppression section 4, and a signal amplification section 5. The noise suppression section 4 includes a first signal power spectrum estimating section 41, a second signal power spectrum estimating section 42, a noise suppression filter coefficient calculating section 43, a noise suppression filter section 44, a learning control section 45, and a spectrum ratio estimating section 46.

The first microphone 1 primarily collects a sound to be intensified and output from the loudspeaker 3, and produces a sound signal. The sound collected by the first microphone 1 is, for example, a natural voice of a speaker or an original sound produced from an instrument being played. Such a sound to be intensified and output from the loudspeaker 3 will hereinafter be referred to as the "target sound". The second microphone 2 primarily collects an intensified sound from the loudspeaker 3 to produce a sound signal. The noise suppression section 4 receives the output signal from the first microphone 1 (sound signal) $x1(n)$ and the output signal from the second microphone 2 (sound signal) $x2(n)$, and outputs the signals while suppressing the component of the intensified sound from the loudspeaker 3, which is to be introduced into the first microphone 1, based on the power spectra of the two output signals x1(*n*) and x2(*n*). Then, the signal amplification section 5 receives the signal output from the noise suppression section 4, and amplifies the signal to output the amplified signal to the loudspeaker 3.

The first signal power spectrum estimating section 41 receives the output signal x1(*n*) from the first microphone 1, and calculates a power spectrum Px1(ω) of the output signal x1(*n*). The second signal power spectrum estimating section 42 receives the output signal x2(*n*) from the second microphone 2, and calculates a power spectrum Px2 (ω) of the output signal x2(*n*). The learning control section 45 receives the output signal x1(*n*) from the first microphone 1 and the output signal x2(*n*) from the second microphone 2, and detects a time period during which the target sound is not being collected and during which the intensified sound from the loudspeaker 3 remaining as a reverberating sound in the sound field is being collected, to output a learning control signal Sc indicating the time period. The spectrum ratio estimating section 46 includes a ratio storing section 461. The spectrum ratio estimating section 46 receives the learning control signal Sc from the learning control section 45, the power spectrum Px1(ω) from the first signal power spectrum estimating section 41, and the power spectrum Px2(ω) from the second signal power spectrum estimating section 42, and obtains a power spectrum ratio Hr(ω) between the two power spectra Px1(ω) and Px2(ω) for the signal component output from the loudspeaker 3, to update the power spectrum ratio stored in the ratio storing section 461. The noise suppression filter coefficient calculating section 43 receives the power spectrum Px1(ω) from the first signal power spectrum estimating section 41 and the power spectrum Px2(ω) from the second signal power spectrum estimating section 42, and calculates the transmission characteristics W(ω) or a filter coefficient hw(n) of the noise suppression filter based on the power spectrum ratio Hr(ω) stored in the ratio storing section 461. The noise suppression filter section 44 receives the transmission characteristics W(ω) or the filter coefficient hw(n) from the noise suppression filter coefficient calculating section 43 and the output signal x1(*n*) from the first microphone 1, and filters the output signal x1(*n*) to output the filtered signal to the signal amplification section 5.

Next, the operation of the howling suppression device of the first embodiment will be described. In FIG. 1, the noise suppression section 4 employs a mechanism such that the target sound, which is input only to the first microphone 1, is allowed to pass through but an acoustic signal being collected both by the first microphone 1 and by the second microphone 2 is regarded as a noise component and is suppressed. The first microphone 1 and the second microphone 2 are provided so as to realize such a method. Specifically, the first microphone 1 is used at a close distance to the mouth of the speaker or to the instrument from which the target sound is being produced, so as to collect the target sound. The second microphone 2 is provided within the same sound field as that where the first microphone 1 and the loudspeaker 3 are placed and at such a position that the second microphone 2 does not collect the target sound but collects an intensified sound and a reverberating sound. The intensified sound is a direct wave component of the sound wave output from the loudspeaker 3 that directly enters the microphone, and the reverberating sound is a reverberating component of the sound wave output from the loudspeaker 3 that enters the microphone after a temporal delay that occurs as the component reflects in the sound field. These components will hereinafter be referred to as the intensified sound and the reverberating sound, respectively. For example, the second microphone 2 may be a microphone provided at a sufficient distance from the speaker or the instrument producing the target sound, or may be a highly directional microphone provided at such a position that the speaker or the instrument producing the target sound is within the dead angle of the directionality. Where the second microphone 2 is a highly directional microphone, if the speaker or the instrument producing the target sound is within the dead angle of the directionality, then the first microphone 1 and the second microphone 2 may be provided close to each other. The second microphone 2 may be provided close to, and in front of, the loudspeaker 3. By providing the first microphone 1 and the second microphone 2 in such a manner as described above, the target sound, such as the voice of a speaker or the sound of an instrument, is collected only by the first microphone 1. The intensified sound or the reverberating sound from the loudspeaker 3, which carries a sufficient sound pressure across a wide area to meet the purpose thereof, will be collected by each of the first and second microphones 1 and 2. Thus, it is possible to obtain a howling suppression effect through a process using the voice of the speaker, or the like, as the target sound and using the intensified sound or the reverberating sound from the loudspeaker 3 as a noise component. A more detailed example of the process will be shown below.

As described above, where the output signal x1(*n*) is output from the first microphone 1 and the output signal x2(*n*) is output from the second microphone 2, the power spectrum Px1(ω) of the output signal x1(*n*) is output from the first signal power spectrum estimating section 41 and the power spectrum Px2(ω) of the output signal x2(*n*) is output from the second signal power spectrum estimating section 42. Due to the signal processing delay through the sound-intensifying system, the position of the first microphone 1 and the position of the second microphone 2 with respect to that of the loudspeaker 3, the sonic speed, etc., there may occur a state where the speaker is not speaking to the first microphone 1 (i.e., no sound is being collected) but the second microphone 2 collects an intensified sound from the loudspeaker 3. There may also occur a state where the intensified sound from the loudspeaker 3 remains as a reverberating sound in the room while the speaker is not producing a voice to the first microphone 1. In the present invention, these states are detected and used in the howling suppression process. This is because the spectrum ratio estimated by the spectrum ratio estimating section 46 needs to be that for the intensified sound from the loudspeaker 3 to be canceled.

The learning control section 45 detects a period (hereinafter referred to as the learning period) in which the second microphone 2 is collecting the intensified sound from the loudspeaker 3, etc., while the first microphone 1 is not collecting the target sound, and outputs the learning control signal Sc indicating the learning period. For example, the learning control section 45 outputs an analog signal x2(*n*)/x1(*n*) as the learning control signal Sc.

Figure 2:
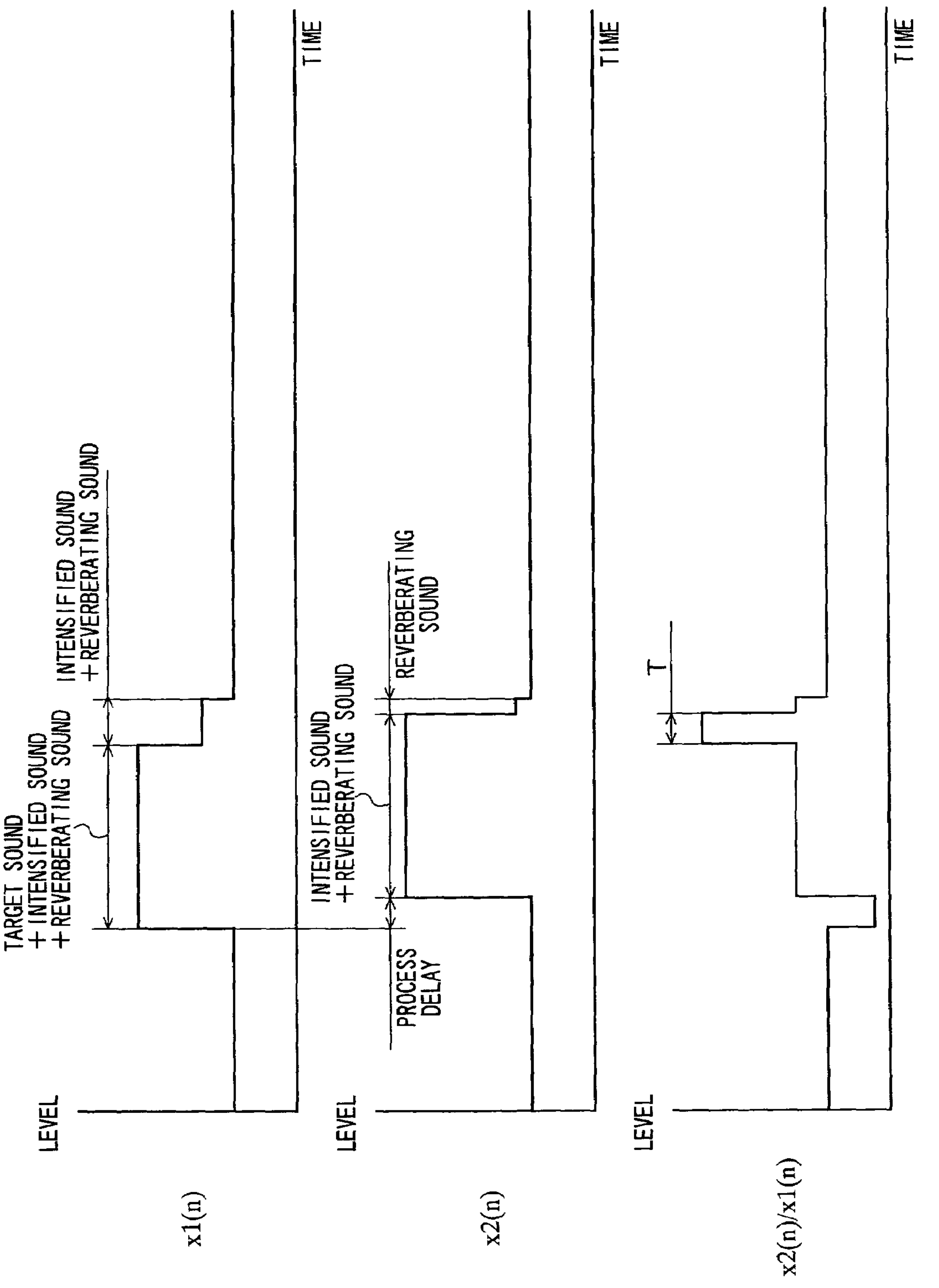
FIG. 2 is a diagram illustrating a chronological relationship between an output signal $x1(n)$ and an output signal $x2(n)$, which are input to the howling suppression device of FIG. 1, and the output $x2(n)/x1(n)$ thereof.

For example, as shown in FIG. 2, the first microphone 1 collects the target sound (actually, the intensified sound and the reverberating sound are superposed on the target sound) and then collects the intensified sound and/or the reverberating sound to output the output signal x1(*n*). The second microphone 2 collects the intensified sound (referring herein to the direct wave component of the intensified sound from the loudspeaker 3 entering the second microphone 2) (actually, the reverberating sound is superposed on the intensified sound) with a delay corresponding to the signal processing time through the sound-intensifying system with respect to the timing at which the collection of the target sound starts, and then collects only the reverberating sound (referring herein to the reverberating component of the intensified sound from the loudspeaker 3 entering the second microphone 2) to output the output signal x2(*n*). The first microphone 1 and the second microphone 2 are typically collecting some noise even when they are not collecting the target sound, the intensified sound, etc. In other words, the output signals x1(*n*) and x2(*n*) do not become zero. Therefore, by using the analog output x2(*n*)/x1(*n*) as the learning control signal Sc, it is possible to determine that the period (the period T in the figure) in which the level of the analog output x2(*n*)/x1(*n*) rapidly increases is the learning period. The exemplary period T shown in FIG. 2 is a period in which the first microphone 1 is not collecting the target sound but is collecting the intensified sound and/or the reverberating sound, and the second microphone 2 is collecting the intensified sound and the reverberating sound. The learning level to be described later may be varied according to the level of the analog output x2(*n*)/x1(*n*).

The spectrum ratio estimating section 46 receives the power spectra Px1(ω) and Px2(ω) as signals, and performs an averaging operation of the power spectrum ratio Hr(ω) using the power spectrum ratio stored in the ratio storing section 461 only when the learning control signal Sc is outputting a signal indicating that learning is done (i.e., a signal indicating the learning period). For example, where the learning control signal Sc is the analog output x2(*n*)/x1(*n*), the spectrum ratio estimating section 46 performs an averaging operation of the power spectrum ratio Hr(ω) only when the signal level of the learning control signal Sc is greater than or equal to a predetermined threshold value. Then, the spectrum ratio estimating section 46 updates the power spectrum ratio stored in the ratio storing section 461. Herein, the spectrum ratio estimating section 46 obtains the power spectrum ratio Hr(ω) as follows:

$$Hr(\omega)=\epsilon\{Px1(\omega)/Px2(\omega)\} \quad (1),$$

where ϵ{•} represents an average. Thus, the spectrum ratio estimating section 46 estimates the power spectrum ratio Hr(ω) between the output signals x1(*n*) and x2(*n*) from the first and second microphones 1 and 2 with respect to the intensified sound and the reverberating sound output from the loudspeaker 3 (i.e., not including the target sound).

Then, the noise suppression filter coefficient calculating section 43 calculates the transmission coefficient W(ω) of the noise suppression filter as follows, for example:

$$W(\omega)=\{Px1(\omega)-Hr(\omega)\cdot Px2(\omega)\}/Px1(\omega) \quad (2),$$

where Hr(ω) is the power spectrum ratio updated by the spectrum ratio estimating section 46 and stored in the ratio storing section 461.

The first term Px1(ω) in the numerator of Expression (2) above is the power spectrum of the signal from the first microphone 1, and has a spectral component obtained as the intensified sound or the reverberating sound from the loudspeaker 3 is mixed in the target sound (e.g., the voice of the speaker). In the second term Hr(ω)·Px2(ω) in the numerator of Expression (2), the power spectrum Px2(ω) of the second microphone 2 primarily collecting the intensified sound from the loudspeaker 3 is multiplied by the power spectrum ratio Hr(ω), thereby obtaining an estimate value of the intensified sound component or the reverberating sound component to be mixed in the power spectrum Px1(ω) of the first microphone 1 according to the power spectrum Px2(ω). Thus, through the calculation of the entire numerator of Expression (2), the estimate value Hr(ω)·Px2(ω) is removed from the power spectrum Px1(ω), where the intensified sound or the reverberating sound has been mixed in the target sound, thereby obtaining a power spectrum S(ω) of only the target sound.

Expression (2) takes the following form:

$$W(\omega)=\text{Target sound signal power spectrum}/\text{Input signal power spectrum}.$$

This is a noise suppression filter expression based on the so-called "Wiener filter" principle. Therefore, the noise suppression filter section 44 can extract an acoustic signal containing only the target sound by multiplying the output signal x1(*n*) from the first microphone 1 by the transmission coefficient W(ω).

Alternatively, the noise suppression filter coefficient calculating section 43 may obtain the filter coefficient hw(n) by performing an inverse Fourier transform on the transmission coefficient W(ω) or by employing a filter design method with the transmission coefficient W(ω) being a target frequency characteristic. In such a case, the noise suppression filter section 44 is filtered by using the filter coefficient hw(n) calculated by the noise suppression filter coefficient calculating section 43. Specifically, the noise suppression filter section 44 filters the output signal x1(*n*) from the first microphone 1 with the filter coefficient hw(n) to remove the intensified sound component entering the first microphone 1 and to extract only the target signal component, and outputs the target signal component to the signal amplification section 5.

Thus, with the howling suppression device of the first embodiment, the intensified sound component or the reverberating sound component entering the first microphone 1 can be suppressed by the noise suppression mechanism. Specifically, a sound component of the intensified sound from the loudspeaker 3 to be reintroduced into the first microphone 1 is suppressed by the noise suppression section 4, thereby cutting off the feedback loop and thus providing a howling suppression effect. As opposed to the conventional adaptive filter method, etc., the method employed by the howling suppression device uses a power spectrum for noise suppression. Specifically, the operation is stable against phase changes because no phase information is used for noise suppression, thus being robust against the movement of the first microphone 1, environmental changes of the sound field, etc., whereby it is possible to realize a stable howling suppression effect.

While the noise suppression section 4 suppresses noise by a method based on the principle of the Wiener filter as described above, the noise suppression may be done by other methods. For example, a spectral subtraction method, or the like, may be used as a method for extracting only the target sound from the input signal x1(*n*) from the first microphone 1 based on the relationship between the power spectrum of the target sound and the power spectrum of the non-target sound, for example.

Second Embodiment

Figure 3:
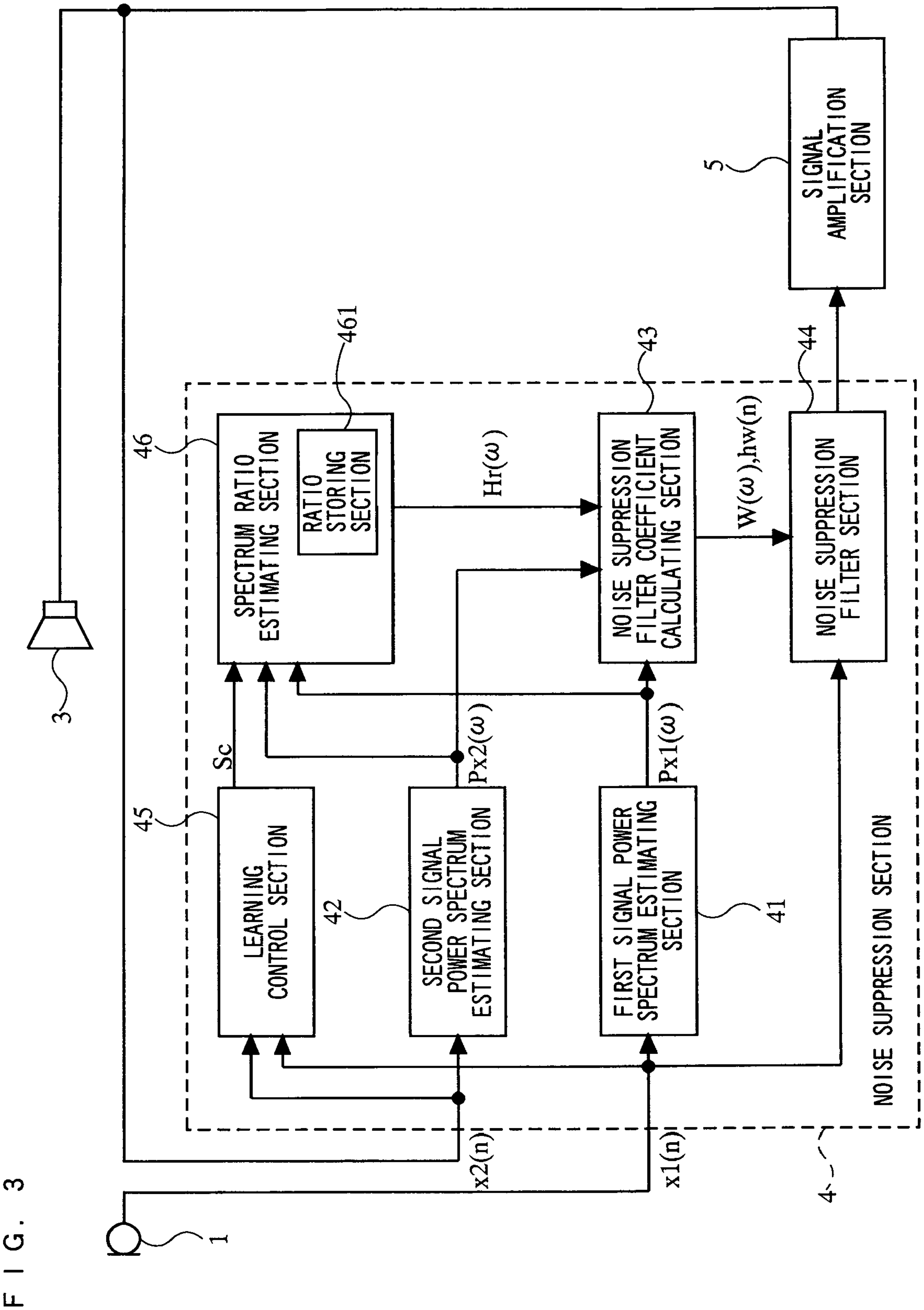
FIG. 3 is a block diagram showing a howling suppression device according to a second embodiment of the present invention.

Next, referring to FIG. 3, a howling suppression device according to a second embodiment of the present invention will be described. FIG. 3 is a block diagram showing the howling suppression device.

Referring to FIG. 3, in the howling suppression device of the second embodiment, as compared with that of the first embodiment, the second microphone 2 is omitted, and the output signal from the signal amplification section 5 is used as the output signal from the second microphone 2. Other elements of the second embodiment, being similar to those of the first embodiment, will be denoted by the same reference numerals and will not be further described below.

Next, the operation of the howling suppression device of the second embodiment will be described. Referring to FIG. 3, the operation of the howling suppression device differs from that of the first embodiment in that the output signal from the signal amplification section 5 is used instead of the output signal from the second microphone 2 as described above. Therefore, the present invention can be realized with a similar operation to that of the first embodiment by using the output signal from the signal amplification section 5 as the output signal x2(*n*).

Figure 4:
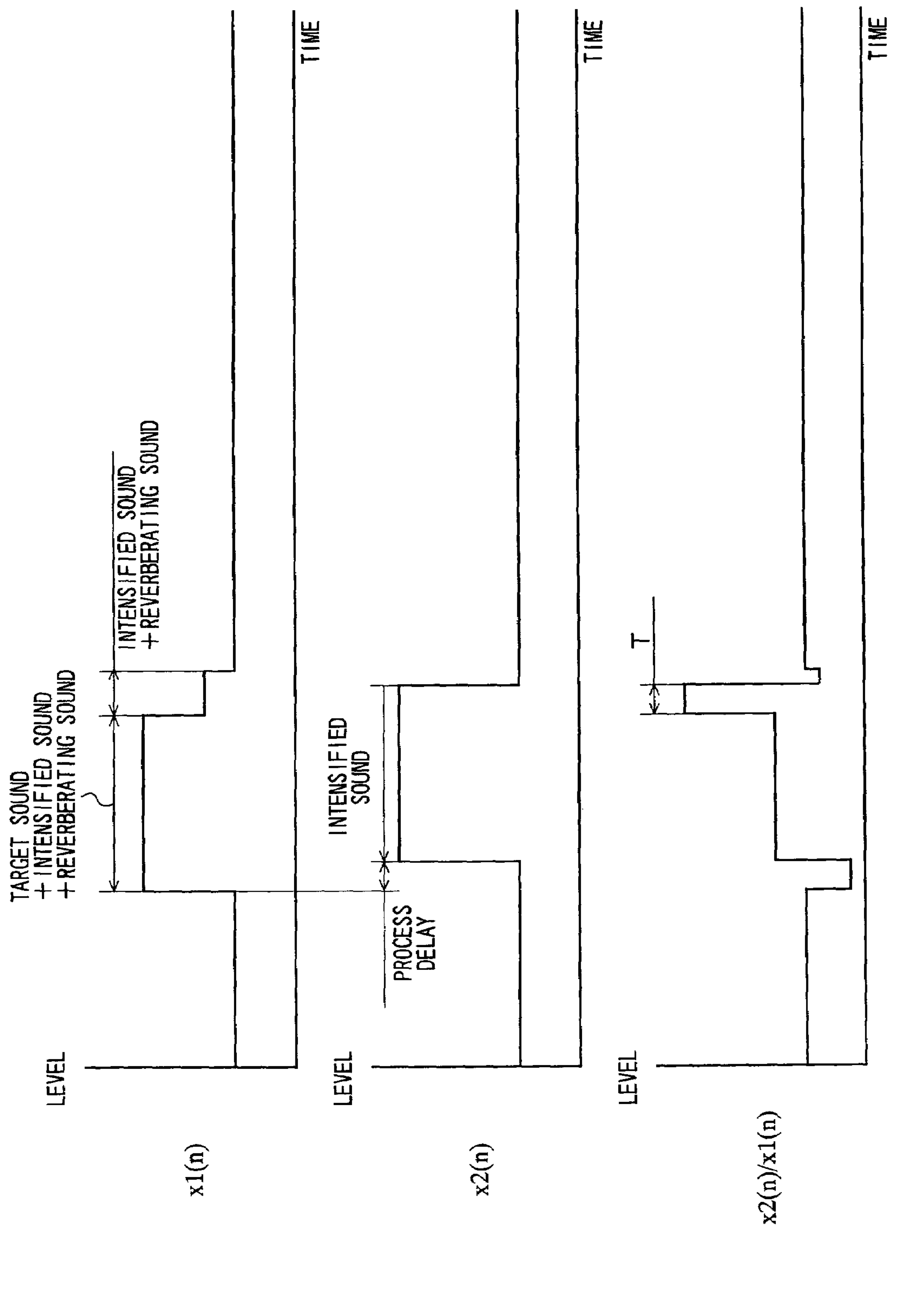
FIG. 4 is a diagram illustrating a chronological relationship between the output signal $x1(n)$ and the output signal $x2(n)$, which are input to the howling suppression device of FIG. 3, and the output $x2(n)/x1(n)$ thereof.

For example, as shown in FIG. 4, the first microphone 1 collects the target sound (actually, the intensified sound and the reverberating sound are superposed on the target sound) and then collects the intensified sound and/or the reverberating sound to output the output signal x1(*n*). The output signal x2(*n*) from the signal amplification section 5 outputs the intensified sound signal being delayed by the signal processing time through the sound-intensifying system with respect to the target sound collecting period. In the second embodiment, since the output signal from the signal amplification section 5 is used, the level for the reverberating sound will not appear in the output signal x2(*n*). However, by using the analog output x2(*n*)/x1(*n*) as the learning control signal Sc, it is possible to determine that the period (the period T in the figure) in which the level of the analog output x2(*n*)/x1(*n*) rapidly increases is the learning period. For example, the exemplary period T shown in FIG. 4 is a period in which the first microphone 1 is not collecting the target sound but is collecting the intensified sound and/or the reverberating sound, and the intensified sound signal is being output from the signal amplification section 5.

The first term Px1(ω) in the numerator of Expression (2) used in the first embodiment is the power spectrum of the signal from the first microphone 1 also in the second embodiment, and has a spectral component obtained as the intensified sound or the reverberating sound from the loudspeaker 3 is mixed in the target sound (e.g., the voice of the speaker). In the second term Hr(ω)·Px2(ω) in the numerator of Expression (2), the power spectrum Px2(ω) based on the intensified sound signal to the loudspeaker 3 is multiplied by the power spectrum ratio Hr(ω), thereby obtaining an estimate value of the intensified sound component or the reverberating sound component to be mixed in the power spectrum Px1(ω) of the first microphone 1 according to the power spectrum Px2(ω). Thus, also in the second embodiment, through the calculation of the entire numerator of Expression (2), the estimate value Hr(ω)·Px2(ω) is removed from the power spectrum Px1(ω), where the intensified sound or the reverberating sound has been mixed in the target sound, thereby obtaining the power spectrum S(ω) of only the target sound.

Specifically, the voice of the speaker, or the like, is regarded as the target sound, whereas the intensified sound from the loudspeaker 3 is input to two inputs of the noise suppression section 4 (i.e., the output signal x1(*n*) from the first microphone 1 and the output signal x2(*n*) from the signal amplification section 5) and is thus suppressed as being noise. The basic operation of the howling suppression device of the second embodiment is similar to that of the first embodiment, and will not be further described below. Thus, in the second embodiment, a system can be configured while omitting the second microphone 2.

Third Embodiment

Figure 5:
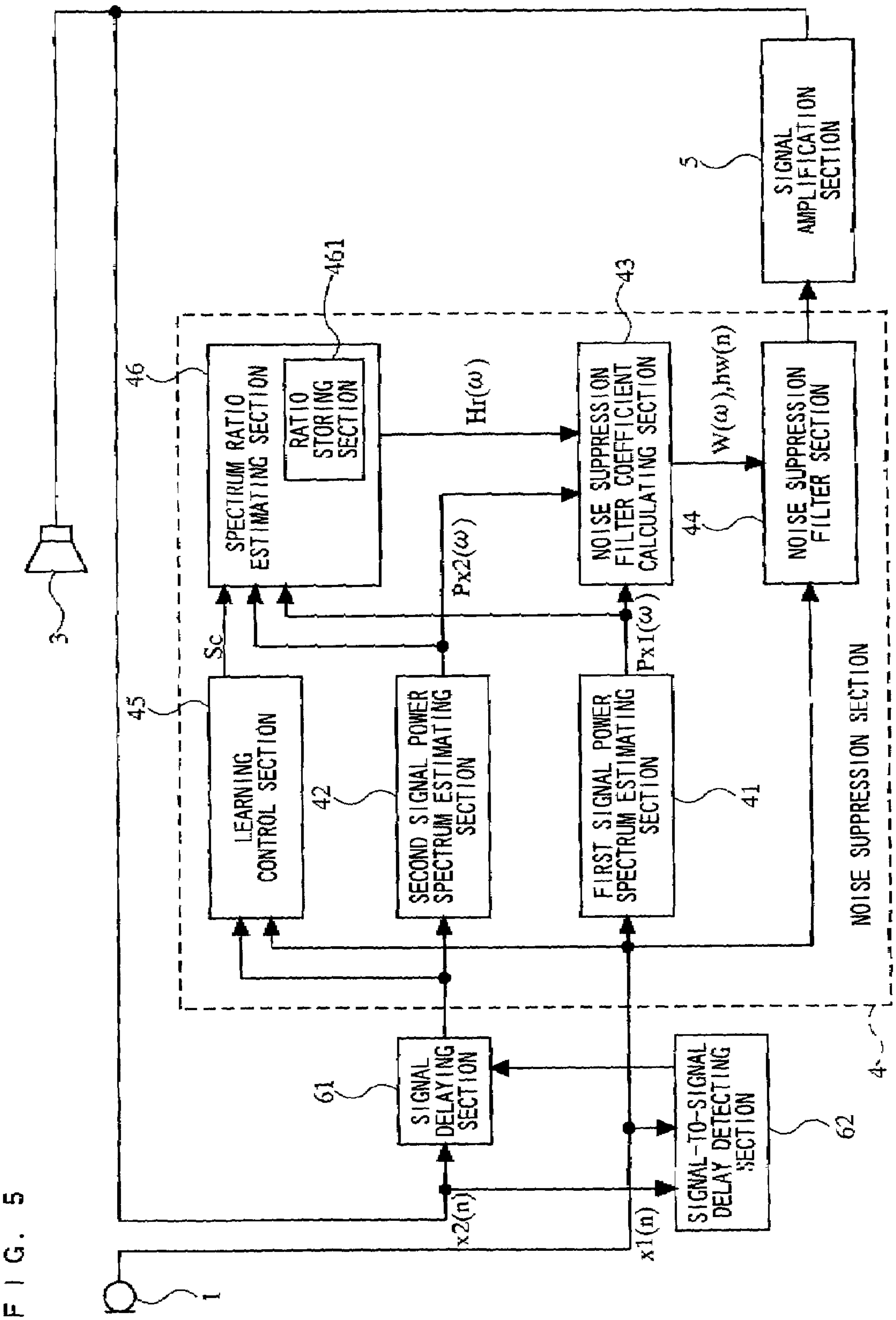
FIG. 5 is a block diagram showing a howling suppression device according to a third embodiment of the present invention.

Next, referring to FIG. 5, a howling suppression device according to a third embodiment of the present invention will be described. FIG. 5 is a block diagram showing the howling suppression device.

Referring to FIG. 5, in the howling suppression device of the third embodiment, as compared with that of the second embodiment, a signal delaying section 61 and a signal-to-signal delay detecting section 62 are provided. Other elements of the third embodiment, being similar to those of the second embodiment, will be denoted by the same reference numerals and will not be further described below.

Referring to FIG. 5, the signal-to-signal delay detecting section 62 receives the output signal x1(*n*) from the first microphone 1 and the output signal x2(*n*) from the signal amplification section 5 to calculate the time delay between the signals. The signal delaying section 61 receives the signal delay time detected by the signal-to-signal delay detecting section 62 and the output signal x2(*n*) from the signal amplification section 5 to output the output signal x2(*n*) from the signal amplification section 5 to the second signal power spectrum estimating section 42 and the learning control section 45 with a delay corresponding to the calculated delay time.

Next, the operation of the howling suppression device of the third embodiment will be described. As compared with a howling suppression method using an adaptive filter, the noise suppression section 4, which uses no phase information for noise suppression, is by nature less influenced by a signal-to-signal time difference. With a very large time difference, however, the correlation between signals may be lost within the range of the analysis window of the power spectrum analysis. Therefore, in an environment where there is expected a large signal-to-signal time difference, it is necessary to correct the time delay.

The time required for the intensified sound output from the loudspeaker 3 to arrive at the first microphone 1 is delayed according to the sonic speed of the sound being transmitted over the distance therebetween. For example, where the howling suppression device is used in a large space, the signal of the intensified sound collected by the first microphone 1 may have a time difference with respect to the output signal from the signal amplification section 5 that is not negligible for the process of the noise suppression section 4. Therefore, the signal-to-signal delay detecting section 62 is used to detect the delay time, and the signal delaying section 61 is used to correct the signal-to-signal time difference. Thus, it is possible to improve the howling suppression performance.

Specifically, the signal-to-signal delay detecting section 62 detects the time delay based on the correlation between the output signal x1(*n*) from the first microphone 1 and the output signal x2(*n*) from the signal amplification section 5. For example, the signal-to-signal delay detecting section 62 calculates a correlation between the output signal x1(*n*) and the output signal x2(*n*) using a power envelope to determine, to be the delay time, the time difference therebetween for which the correlation coefficient is highest. Then, the signal delaying section 61 outputs the output signal x2(*n*) to the second signal power spectrum estimating section 42 and the learning control section 45 with a delay corresponding to the delay time detected by the signal-to-signal delay detecting section 62.

Figure 6:
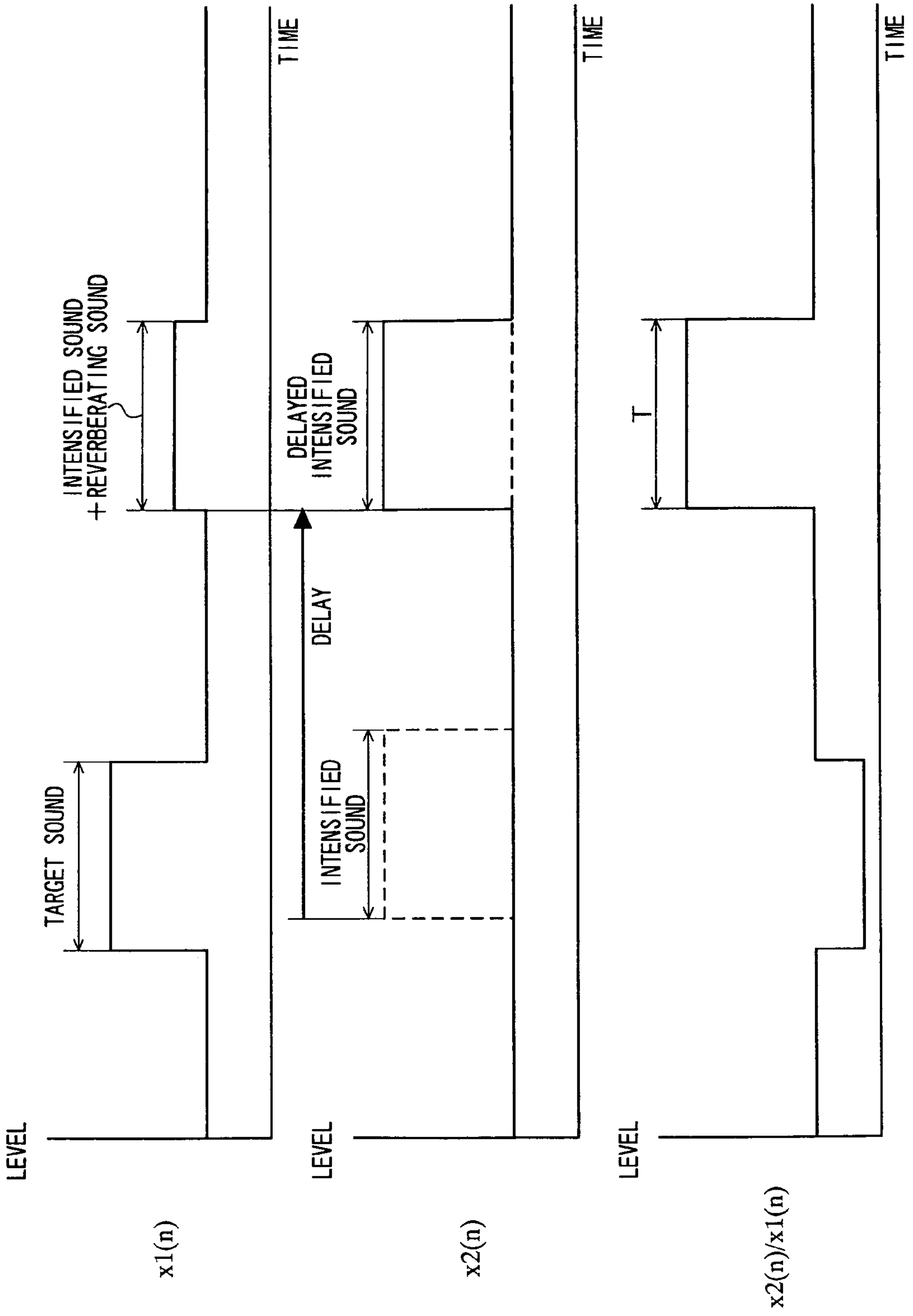
FIG. 6 is a diagram illustrating a chronological relationship between the output signal $x1(n)$ and the output signal $x2(n)$, which are input to the howling suppression device of FIG. 5, and the output $x2(n)/x1(n)$ thereof.
Figure 7:
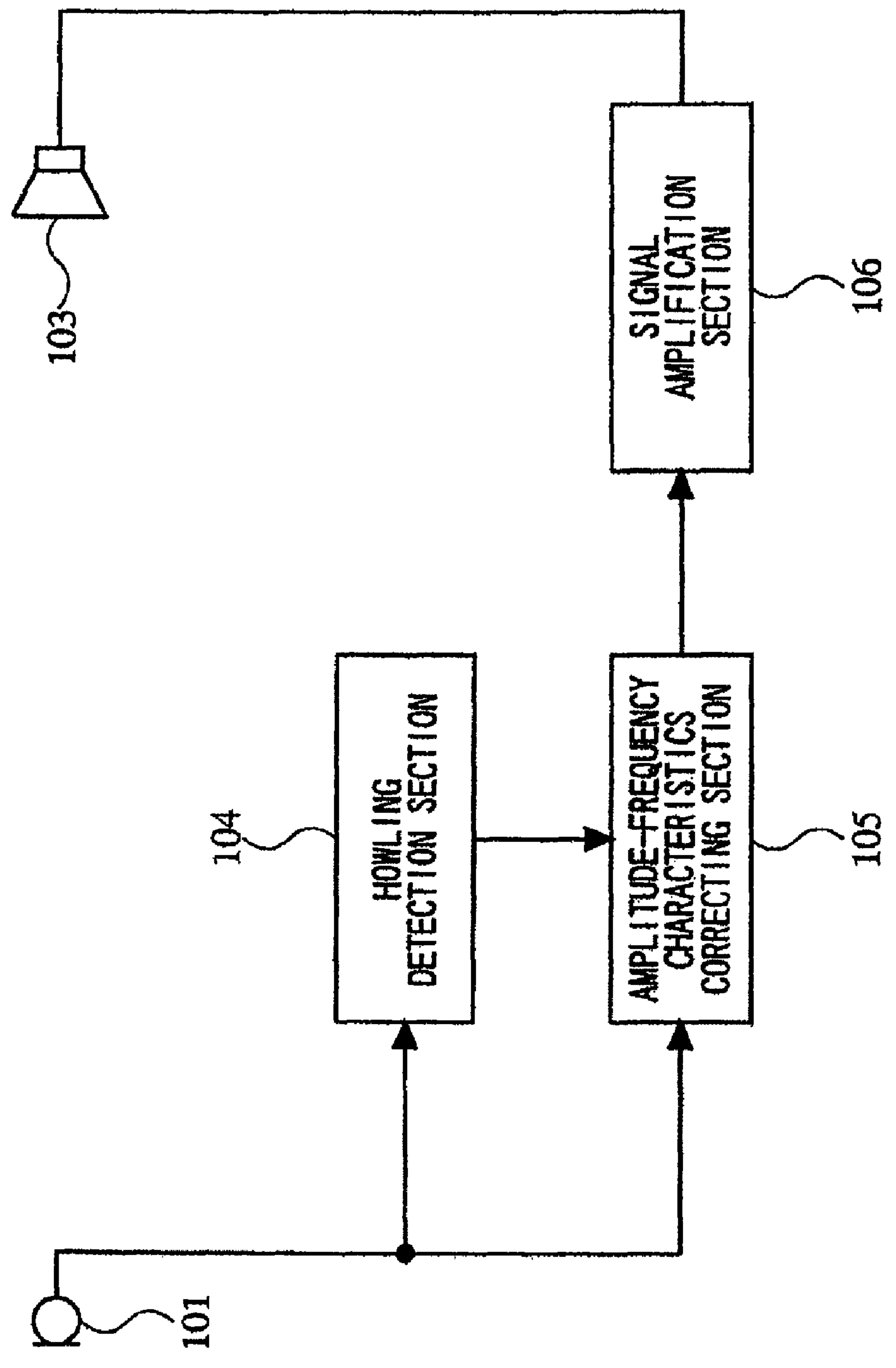
FIG. 7 PRIOR ART
FIG. 7 is a block diagram showing an exemplary configuration of a conventional sound-intensifying device.
Figure 8:
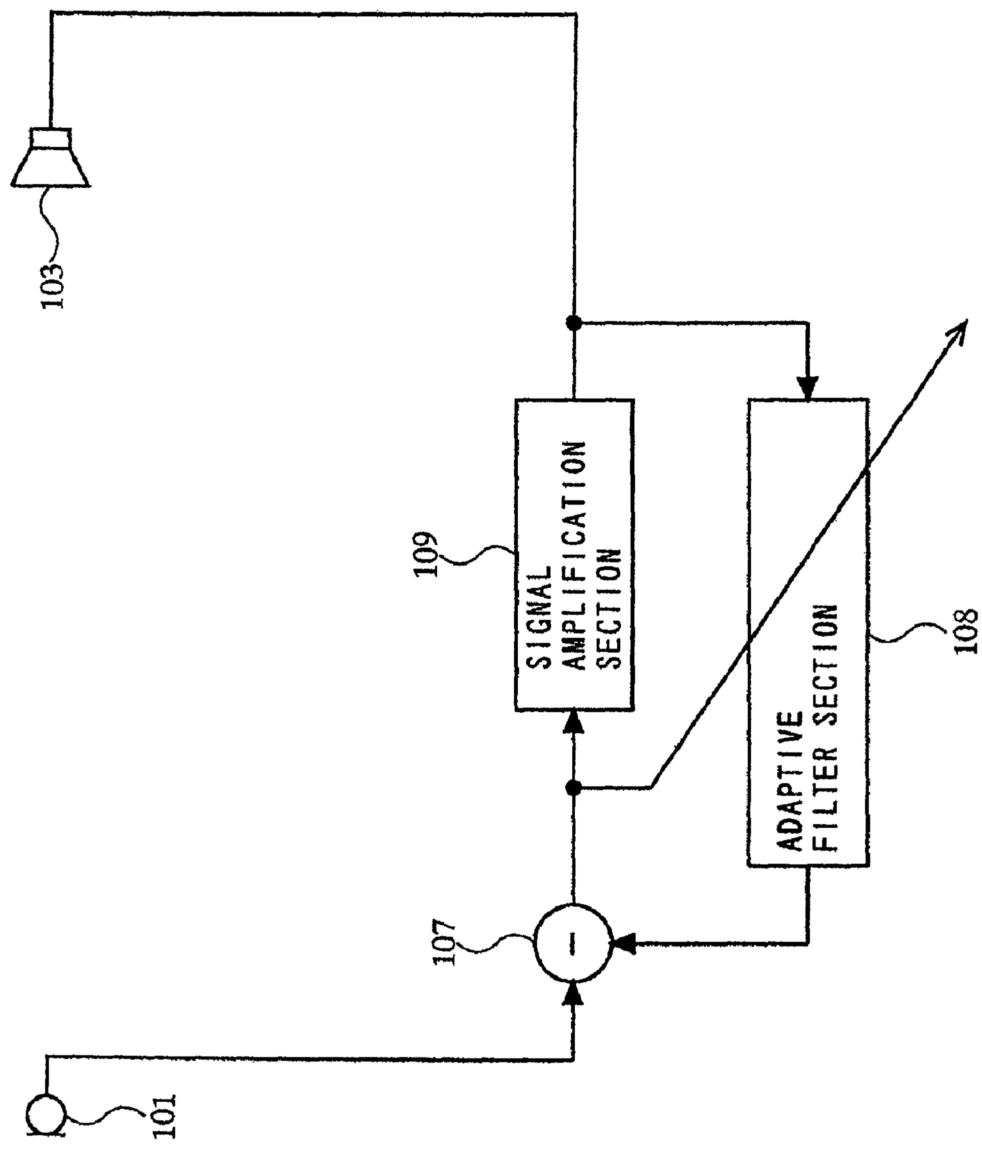
F I G. 8 PRIOR ART
FIG. 8 is a block diagram showing another exemplary configuration of a conventional sound-intensifying device.

For example, as shown in FIG. 6, the first microphone 1 collects the intensified sound and/or the reverberating sound and outputs the output signal x1(*n*) after the elapse of the time difference described above from when the target sound is collected. The output signal x2(*n*) from the signal amplification section 5 outputs the intensified sound signal being delayed by the signal processing time through the sound-intensifying system with respect to the target sound collecting period. In the third embodiment, since the output signal from the signal amplification section 5 is used, the level for the reverberating sound will not appear in the output signal x2(*n*). The broken line in FIG. 6 denotes the output signal x2(*n*) before it is delayed by the signal delaying section 61.

In such a case, the signal-to-signal delay detecting section 62 detects, with the correlation described above, the intensified sound and/or the reverberating sound collected by the first microphone 1, corresponding to the intensified sound signal appearing in the output signal x2(*n*). The signal-to-signal delay detecting section 62 determines the time difference therebetween detected by the correlation to be the delay time. Then, the signal delaying section 61 outputs the output signal x2(*n*) to the second signal power spectrum estimating section 42 and the learning control section 45 with a delay corresponding to the delay time calculated by the signal-to-signal delay detecting section 62. Since the delay time varies due to environmental changes of the sound field (e.g., the movement of the first microphone 1), the signal-to-signal delay detecting section 62 adjusts the delay time as necessary.

As in the first and second embodiments, by using the analog output x2(*n*)/x1(*n*) as the learning control signal Sc, the learning control section 45 can indicate, as the learning period, the period (the period T in the figure) in which the level of the analog output x2(*n*)/x1(*n*) rapidly increases. For example, the exemplary period T shown in FIG. 6 is a period in which the first microphone 1 is not collecting the target sound but is collecting the intensified sound and/or the reverberating sound, and the intensified sound signal is being output from the signal amplification section 5, i.e., a period similar to that of the second embodiment.

Referring back to FIG. 5, the operation of the howling suppression device of the third embodiment differs from that of the second embodiment in that the output signal from the signal amplification section 5, instead of the output signal from the second microphone 2, is used while being delayed by the delay time described above. Therefore, by using the output signal from the signal amplification section 5 delayed by the delay time described above as the output signal x2(*n*), the present invention can be realized with a similar operation to that of the second embodiment. Specifically, the voice of the speaker, or the like, is regarded as the target sound, whereas the intensified sound from the loudspeaker 3 is input to two inputs of the noise suppression section 4 (i.e., the output signal x1(*n*) from the first microphone 1 and the output signal x2(*n*) from the signal amplification section 5 delayed by the delay time described above) and is thus suppressed as being noise. The basic operation of the howling suppression device of the third embodiment, being similar to those of the first and second embodiments, will not be further described below.

While the third embodiment is directed to a howling suppression device in which the signal-to-signal time difference is corrected by the signal delaying section 61 when the signal of the intensified sound collected by the first microphone 1 has a time difference with respect to the output signal from the signal amplification section 5 that is not negligible for the process of the noise suppression section 4, a similar situation may occur with the howling suppression device described above in the first embodiment (see FIG. 1). For example, where the first microphone 1, relative to the second microphone 2, is placed much farther away from the loudspeaker 3, the signal of the intensified sound collected by the first microphone 1 may have a time difference with respect to the output signal from the second microphone that is not negligible for the process of the noise suppression section 4. In such a case, by providing the signal delaying section 61 and the signal-to-signal delay detecting section 62 in the howling suppression device of the first embodiment, and by performing a similar process to the third embodiment for a time delay with the output signal from the second microphone 2 being x2(*n*), it is possible to correct the time difference also with the howling suppression device of the first embodiment.

The noise suppression section 4, the signal delaying section 61 and the signal-to-signal delay detecting section 62 described above in the first to third embodiments can be realized by, for example, an information processing device such as an ordinary computer system that receives the output signals x1(*n*) and x2(*n*) and outputs the process results to the signal amplification section 5. Then, the present invention can be realized by storing a program for instructing a computer to perform operations as described above in a predetermined storage medium, which can be read out from the storage medium and executed by the computer. The storage medium storing the program may be a non-volatile semiconductor memory such as a ROM or a flash memory, or an optical disc storage medium such as a CD-ROM, a DVD, or the like. The program may be supplied to the information processing device via other media or a communication line.

The noise suppression section 4, the signal delaying section 61 and the signal-to-signal delay detecting section 62 described above in the first to third embodiments can be realized by, for example, an integrated circuit that receives the output signals x1(*n*) and x2(*n*) and outputs the results of the sound signal processing operation to the signal amplification section 5. Then, the present invention can be realized by integrating electric circuits serving functions as described above into a single small package to form a sound signal processing circuit DSP (Digital Signal Processor), or the like, for performing the sound signal processing operation, etc.

The howling suppression device, the howling suppression program, the integrated circuit, and the howling suppression method of the present invention are applicable to an acoustic device for intensifying an acoustic signal collected by a microphone and outputting the intensified signal from a loudspeaker, and can be used in an ordinary sound-intensifying system such as a mixer, a sound-intensifying processor, or a sound-intensifying amplifier, as well as in a conference system, a hands-free taking device, etc.

The invention claimed is:

1. A howling suppression device for suppressing howling, which occurs when amplifying a target sound collected by a first microphone through an amplification section and outputting the amplified sound as an intensified sound from a loudspeaker, the howling suppression device comprising:

- a first power spectrum information producing section for producing a first power spectrum according to a first acoustic signal output, as an electric signal, from the first microphone that collects a sound and converts the sound into the electric signal;
- second acoustic signal obtaining means for obtaining a second acoustic signal that is an electric signal of a sound including the intensified sound and not including the target sound;
- a second power spectrum information producing section for producing a second power spectrum according to the second acoustic signal;
- a learning control section for, based on the first acoustic signal and the second acoustic signal, detecting a period in which (i) the first microphone is not collecting the target sound, and (ii) the second acoustic signal is indicating the intensified sound or a reverberating sound of the intensified sound, and for outputting a control signal indicating the detected period;

a ratio storing section for storing a ratio of the second power spectrum with respect to the first power spectrum;

a spectrum ratio estimating section for calculating the ratio of the second power spectrum with respect to the first power spectrum when the control signal indicates the detected period, and updating the ratio stored in the ratio storing section according to a predetermined method using the calculated ratio; and a suppression filter section for (i) estimating a sound component, other than the target sound, that has been mixed in the first acoustic signal, the sound component that has been mixed in the first acoustic signal being estimated by using the first power spectrum, the second power spectrum, and the ratio stored in the ratio storing section, and (ii) suppressing the sound component in the first acoustic signal so as to output only an acoustic signal of the target sound to the amplification section.

2. The howling suppression device according to claim 1, wherein the second acoustic signal obtaining means is a second microphone provided in a sound field in which the first microphone and the loudspeaker are provided, the second microphone not collecting the target sound while collecting intensified sound in the sound field to convert the collected intensified sound into the electric signal that is the second acoustic signal.

3. The howling suppression device according to claim 1, wherein the second acoustic signal obtaining means is connected to a line that connects the amplification section to the loudspeaker, and obtains, as the second acoustic signal, a signal output from the amplification section.

4. The howling suppression device according to claim 1, further comprising:

a signal-to-signal delay detecting section for detecting a delay time between the first acoustic signal output from the first microphone and the second acoustic signal; and a signal delaying section for inputting the second acoustic signal to the second power spectrum information producing section after delaying the second acoustic signal according to the delay time detected by the signal-to-signal delay detecting section.

5. The howling suppression device according to claim 1, wherein:

the learning control section outputs the control signal indicating the detected period by a signal level ratio, which is a ratio of a signal level of the second acoustic signal with respect to a signal level of the first acoustic signal; and the spectrum ratio estimating section calculates the ratio of the second power spectrum with respect to the first power spectrum when the signal level ratio indicated by the control signal is greater than or equal to a threshold value.

6. The howling suppression device according to claim 1, wherein the suppression filter section filters the first acoustic signal by a Wiener filter method based on the first power spectrum and the second power spectrum, so as to output only an acoustic signal of the target sound to the amplification section.

7. The howling suppression device according to claim 1, wherein the suppression filter section filters the first acoustic signal by a spectral subtraction method based on the first power spectrum and the second power spectrum, so as to output only an acoustic signal of the target sound to the amplification section.

8. A computer-readable recording medium having a howling suppression program recorded thereon, the howling suppression program for suppressing howling, which occurs when amplifying a target sound collected by a first microphone through an amplification section and outputting the amplified sound as an intensified sound from a loudspeaker, the howling suppression program causing a computer to execute a method comprising:

a first power spectrum information producing step of producing a first power spectrum according to a first acoustic signal output, as an electric signal, from the first microphone that collects a sound and converts the sound into the electric signal;

a second acoustic signal obtaining step of obtaining a second acoustic signal that is an electric signal of a sound including the intensified sound and not including the target sound;

a second power spectrum information producing step of producing a second power spectrum according to the second acoustic signal;

a learning control step of, based on the first acoustic signal and the second acoustic signal, detecting a period in which (i) the first microphone is not collecting the target sound, and (ii) the second acoustic signal is indicating the intensified sound or a reverberating sound of the intensified sound, and of outputting a control signal indicating the detected period;

a ratio storing step of storing, in a ratio storing section, a ratio of the second power spectrum with respect to the first power spectrum;

a spectrum ratio estimating step of calculating the ratio of the second power spectrum with respect to the first power spectrum when the control signal indicates the detected period, and updating the ratio stored in the ratio storing section according to a predetermined method using the calculated ratio; and a suppression step of (i) estimating a sound component, other than the target sound, that has been mixed in the first acoustic signal, the sound component that has been mixed in the first acoustic signal being estimated by using the first power spectrum, the second power spectrum, and the ratio stored in the ratio storing section, and (ii) suppressing the sound component in the first acoustic signal so as to output only an acoustic signal of the target sound to the amplification section.

9. An integrated circuit for suppressing howling, which occurs when amplifying a target sound collected by a first microphone through an amplification section and outputting the amplified sound as an intensified sound from a loudspeaker, the integrated circuit comprising:

a first power spectrum information producing section for receiving a first acoustic signal output, as an electric signal, from the first microphone that collects a sound and converts the sound into the eclectic signal, and for producing a first power spectrum according to the first acoustic signal;

a second power spectrum information producing section for receiving a second acoustic signal that is an electric signal of a sound including the intensified sound and not including the target sound, and for producing a second power spectrum according to the second acoustic signal;

a learning control section for, based on the first acoustic signal and the second acoustic signal, detecting a period in which (i) the first microphone is not collecting the target sound, and (ii) the second acoustic signal is indicating the intensified sound or a reverberating sound of the intensified sound, and for outputting a control signal indicating the detected period;

a ratio storing section for storing a ratio of the second power spectrum with respect to the first power spectrum;

a spectrum ratio estimating section for calculating the ratio of the second power spectrum with respect to the first power spectrum when the control signal indicates the detected period, and updating the ratio stored in the ratio storing section according to a predetermined method using the calculated ratio; and a suppression filter section for (i) estimating a sound component, other than the target sound, that has been mixed in the first acoustic signal, the sound component that has been mixed in the first acoustic signal being estimated by using the first power spectrum, the second power spectrum, and the ratio stored in the ratio storing section, and (ii) suppressing the sound component in the first acoustic signal so as to output only an acoustic signal of the target sound to the amplification section the amplification section.

10. A howling suppression method for suppressing howling, which occurs when amplifying a target sound collected by a first microphone through an amplification section and outputting the amplified sound as an intensified sound from a loudspeaker, the howling suppression method comprising:

a first power spectrum information producing step of producing a first power spectrum according to a first acoustic signal output, as an electric signal, from the first microphone that collects a sound and converts the sound into the electric signal;

a second acoustic signal obtaining step of obtaining a second acoustic signal that is an electric signal of a sound including the intensified sound and not including the target sound;

second power spectrum information producing step of producing a second power spectrum according to the second acoustic signal;

a learning control step of, based on the first acoustic signal and the second acoustic signal, detecting a period in which (i) the first microphone is not collecting the target sound, and (ii) the second acoustic signal is indicating the intensified sound or a reverberating sound of the intensified sound, and of outputting a control signal indicating the detected period;

a ratio storing step of storing, in a ratio storing section, a ratio of the second power spectrum with respect to the first power spectrum;

a spectrum ratio estimating step of calculating the ratio of the second power spectrum with respect to the first power spectrum when the control signal indicates the detected period, and updating the ratio stored in the ratio storing section according to a predetermined method using the calculated ratio; and a suppression step of (i) estimating a sound component, other than the target sound, that has been mixed in the first acoustic signal, the sound component that has been mixed in the first acoustic signal being estimated by using the first power spectrum, the second power spectrum, and the ratio stored in the ratio storing section, and (ii) suppressing the sound component in the first acoustic signal so as to output only an acoustic signal of the target sound to the amplification section.

* * * * *